United States Patent
Reed et al.

(10) Patent No.: US 11,498,377 B2
(45) Date of Patent: Nov. 15, 2022

(54) SYSTEMS AND METHODS FOR DETERMINING AN IDENTITY OF A TRAILER

(71) Applicant: Toyota Motor Engineering & Manufacturing North America, Inc., Plano, TX (US)

(72) Inventors: Frankie B. Reed, Ypsilanti, MI (US); Derek A. Thompson, Ypsilanti, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 175 days.

(21) Appl. No.: 16/891,537

(22) Filed: Jun. 3, 2020

(65) Prior Publication Data
US 2021/0379944 A1 Dec. 9, 2021

(51) Int. Cl.
| G06K 9/00 | (2022.01) |
| B60D 1/62 | (2006.01) |
| B60R 16/023 | (2006.01) |
| G06V 20/56 | (2022.01) |

(52) U.S. Cl.
CPC .............. *B60D 1/62* (2013.01); *B60R 16/023* (2013.01); *G06T 2207/30252* (2013.01); *G06V 20/56* (2022.01)

(58) Field of Classification Search
CPC ................... B60D 1/62; B60R 16/023; G06T 2207/30252; G06V 20/56
See application file for complete search history.

(56) References Cited

U.S. PATENT DOCUMENTS

| 8,862,283 B2 | 10/2014 | Kahler et al. |
| 9,037,349 B2 | 5/2015 | Trombley et al. |
| 9,919,652 B2 | 3/2018 | Dupuis et al. |
| 2005/0017856 A1* | 1/2005 | Peterson ............... B60T 17/228 340/431 |
| 2018/0040129 A1 | 2/2018 | Dotzler |
| 2018/0293891 A1* | 10/2018 | Troutman ............ G07C 5/0825 |
| 2019/0347498 A1 | 11/2019 | Herman et al. |
| 2020/0412574 A1* | 12/2020 | Haslam ............... G01C 21/3469 |

FOREIGN PATENT DOCUMENTS

| CN | 104700623 A | 6/2015 |
| DE | 102008033844 A1 | 1/2010 |
| EP | 1473190 B1 | 11/2005 |

* cited by examiner

*Primary Examiner* — Dhaval V Patel
(74) *Attorney, Agent, or Firm* — Dinsmore & Shohl LLP (57) ABSTRACT

Embodiments related to systems and methods for determining an identity of a trailer coupled to a vehicle are provided herein. The system includes one or more trailer lamps, a trailer lamp current sensing device electrically coupled to the one or more trailer lamps, one or more processors, one or more data storage devices, one or more memory modules communicatively coupled to the one or more processors and storing machine readable instructions that cause the system to perform at least the following when executed by the one or more processors: receive a sensed current signal from the trailer lamp current sensing device, determine whether an amperage level of the sensed current signal is associated with a trailer identification stored within the one or more data storage devices, and notifying a user of the trailer identification stored in the one or more data storage devices for the trailer connected to the vehicle.

20 Claims, 3 Drawing Sheets

SYSTEMS AND METHODS FOR DETERMINING AN IDENTITY OF A TRAILER

TECHNICAL FIELD

The present specification generally relates to systems and methods for determining an identity of a trailer and, more specifically, systems and methods for determining the identity of a trailer connected to a vehicle, and reporting the identity of the trailer to a user.

BACKGROUND

Currently, a driver may own several types or styles of trailers. For example, a driver may have a gooseneck trailer, a livestock trailer, a flatbed trailer, a horse trailer, a travel trailer, etc. Besides different trailer designs, a driver may also own trailers of different makes and models. Different trailers have different trailer characteristics, such as length, width and weight. Vehicle systems may use trailer characteristic when performing assistive vehicle maneuvers, such as backup assist.

Accordingly, a need exists for alternative systems and methods for identifying a particular type of trailer connected to a vehicle and notifying the user of the identity of the trailer.

SUMMARY

Embodiments related to systems and methods for determining an identity of a trailer coupled to a vehicle are provided herein. The system includes one or more trailer lamps, a trailer lamp current sensing device electrically coupled to the one or more trailer lamps, one or more processors, one or more data storage devices, one or more memory modules communicatively coupled to the one or more processors and storing machine readable instructions that cause the system to perform at least the following when executed by the one or more processors: receive a sensed current signal from the trailer lamp current sensing device, determine whether an amperage level of the sensed current signal is associated with a trailer identification stored within the one or more data storage devices, and notifying a user of the trailer identification stored in the one or more data storage devices for the trailer connected to the vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
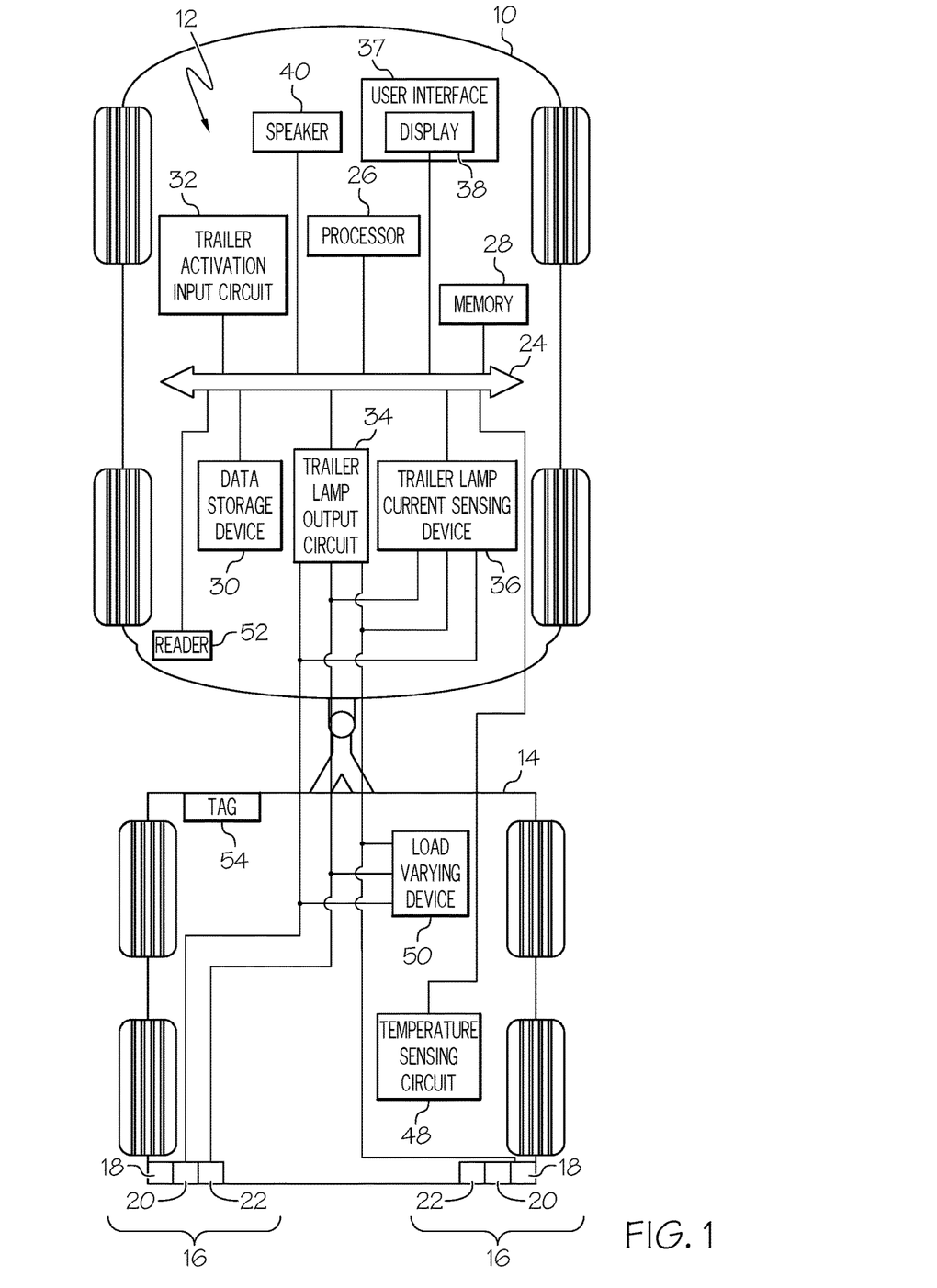
FIG. 1 schematically depicts a vehicle including an example system for determining an identify of a trailer coupled to the vehicle, according to one or more embodiments shown and described herein.
Figure 2:
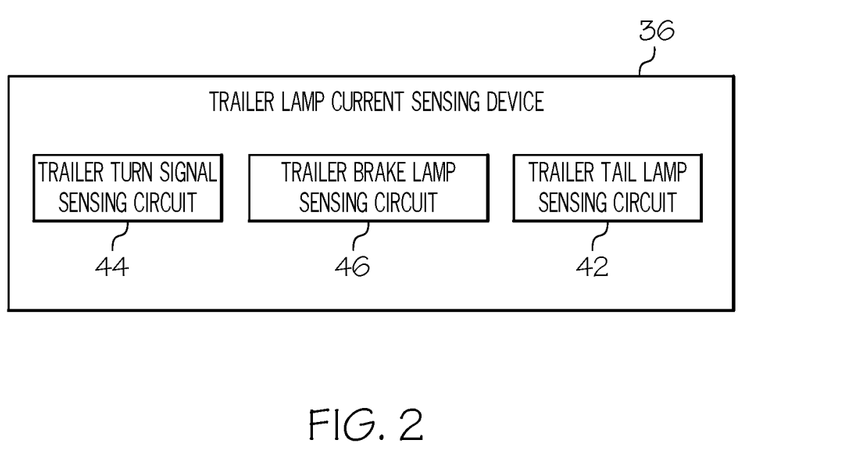
FIG. 2 schematically depicts an example trailer current sensing device for sensing a current sent to one or more trailer lamps, according to one or more embodiments shown and described herein.

The embodiments disclosed herein include systems and methods for determining an identity of a trailer hitched to a vehicle. Referring to FIGS. 1 and 2, a system for determining an identity of a trailer coupled to a vehicle may include a processor, a data storage device, a memory module, a trailer lamp output circuit, a trailer lamp current sensing device, and machine readable instructions stored in the memory module is discussed. The machine readable instructions may cause the system to receive a sensed current signal from the trailer lamp current sensing device, determine whether an amperage level of the sensed current signal is associated with a trailer identification stored within the data storage device, and notify a user of the trailer identification associated with the trailer coupled to the vehicle. Various embodiments of the systems and methods for determining an identity of a trailer will be described in more detail herein.

Referring now to FIG. 1, an embodiment of an example vehicle 10 may include an example system 12 for determining an identity of a trailer 14 connected to the vehicle 10. In some embodiments, the vehicle 10 may be an automobile or any other passenger or non-passenger vehicle such as, for example, a tractor or tractor truck.

In one or more embodiments, the trailer 14 may be any unpowered vehicle having one or more wheels capable of being pulled by the vehicle 10 such as, for example, an auto hauler, a flatbed trailer, a gooseneck trailer, a travel trailer, a utility trailer, a horse trailer, and the like. As depicted in FIG. 1, the trailer 14 may include one or more trailer lamps 16 in some embodiments. In one or more embodiments, the trailer lamps 16 may include one or more trailer tail lamps 18, one or more trailer turn signal lamps 20, and one or more trailer brake lamps 22. For example, a right side of a rear of the trailer 14 may include the one or more trailer tail lamps 18, the one or more trailer turn signal lamps 20, and/or the one or more trailer brake lamps 22. Likewise, a left side of the rear of the trailer 14 may include the one or more trailer tail lamps 18, the one or more trailer turn signal lamps 20, and/or the one or more trailer brake lamps 22. However, it should be understood that in other embodiments, the trailer 14 may include more or less trailer lamps 16 than shown in FIG. 1. For example, the trailer 14 may also include the one or more trailer lamps 16 located along a side (not shown) of the trailer 14 or on an undercarriage (not shown) of the trailer 14.

In some embodiments, the vehicle 10 may include a communication path 24, one or more processors 26, one or more memory modules 28, one or more data storage devices 30, a trailer activation input circuit 32, a trailer lamp output circuit 34, a trailer lamp current sensing device 36, one or more user interfaces 37 having an optional display 38, and an optional speaker 40. In one or more embodiments, the trailer lamp current sensing device 36 may include a trailer tail lamp sensing circuit 42, a trailer brake lamp sensing circuit 46, and a trailer turn signal sensing circuit 44. Alternatively, one circuit may be provided for sensing an amperage levels of all trailer lamps 16. The various components of the system 12 and the interaction thereof will be described in detail below.

In one or more embodiments, the communication path 24 may be formed from any medium that is capable of transmitting a signal such as for example, conductive wires, conductive traces, connectors, buses that cooperate to permit the transmission optical waveguides, or the like. Moreover, the communication path 24 may be formed from a combination of conductive traces, conductive wires, connectors, and buses that cooperate to permit the transmission of electrical data signals to components such as the one or more processors 26, the one or more memory module 28, one or more sensing devices 36, the one or more user interfaces 37 (e.g. the display 38), one or more output devices (e.g. a display (not shown) and the speaker 40), and communication devices (not shown). Accordingly, the communication path 24 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular wave, square-wave, vibration, and the like, capable of traveling through a medium. The communication path 24 communicatively couples the various components of the system 12. As used herein, the term "communicatively coupled" means that coupled components are capable of exchanging data signals with one another such as, for example, electrical signals via conductive medium, electromagnetic signals via air, optical signals via optical waveguides, and the like.

In one or more embodiments, the one or more processors 26 of the system 12 may be any device capable of executing machine readable instructions. Accordingly, each of the one or more processors 26 may be a controller, an integrated circuit, a microchip, a computer, or any other computing device. The one or more processors 26 are communicatively coupled to the other components of the system 12 by the communication path 24. Accordingly, the communication path 24 may communicatively couple the one or more processors 26 with one another, and allow the components coupled to the communication path 24 to operate in a distributed computing environment. Specifically, each of the components may operate as a node that may send and/or receive data.

In some embodiments, the one or more memory modules 28 of the system 12 may be coupled to the communication path 24 and communicatively coupled to the one or more processors 26. The one or more memory modules 28 may comprise RAM, ROM, flash memories, hard drives, or any device capable of storing machine readable instructions such that the machine readable instructions can be accessed and executed by the one or more processors 26. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 28. Alternatively, the machine readable instructions may be written in a hardware description language (HDL), such as logic implemented via either a field programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In some embodiments, the one or more data storage devices 30, which may generally be a storage medium, may contain one or more repositories for storing data that is received and/or generated. The one or more data storage devices 30 may be any physical storage medium, including but not limited to, a hard disk drive (HDD), memory removable storage, and/or the like. Illustrative data that may be contained within the one or more data storage devices 30 and may include data related to trailer identification information such as a trailer ID name, tail lamp amperage level, brake lamp amperage level, turn signal amperage level, temperature signal, tire pressure, tire axel, trailer external temperature, trailer brakes, a length of the trailer 14, a height of the trailer 14, a width of the trailer 14, a photo image of the trailer 14, and the like. In one embodiment, the database includes a plurality of trailer profiles. Each trailer profile may include a trailer make, a trailer model, a type of trailer 14, a length of the trailer 14, a height of the trailer 14, a width of the trailer 14, a photo image of the trailer 14, a temperature range along with associated amperage level or current profiles of tail lamps, brake lamps, and turn signal lamps, trailer brake and tire pressure. In some embodiments, the one or more data storage devices 30 and the one or more memory modules 28 are integrated into one component.

Still referring to FIG. 1, the trailer activation input circuit 32 is communicatively coupled to the one or more processors 26 and are coupled to the communication path 24 in one embodiment. In one or more embodiments, when the trailer 14 is hooked up to the vehicle 10, the trailer activation input circuit 32 may receive a detection signal indicating that the trailer 14 has been connected to the vehicle 10. As a non-limiting example, a wiring harness (not shown) may connect the trailer 14 to the vehicle 10 to supply power to the trailer 14 and to transmit and receive information between the vehicle 10 and the trailer 14. Upon connection, the trailer activation input circuit 32 may detect the presence of the trailer 14 by detecting an active power supply to the trailer 14, for example. In some embodiments, the trailer activation input circuit 32 may provide the trailer lamp activation signal to the one or more processors 26 to request the identity of the trailer 14 based on detection of the trailer 14. As a non-limiting example, the trailer activation input circuit 32 may be coupled to the user interface 37, such as a graphical user interface (not shown) located within the display 38 or a trailer activation button configured to transmit a request signal to indicate that the trailer 14 is coupled to the vehicle 10 and request an identity of the trailer 14.

In some embodiments, the trailer lamp output circuit 34 may be coupled to the communication path 24 and communicatively coupled to the one or more processors 26. In one more embodiments, the trailer lamp output circuit 34 is electrically coupled to the one or more trailer tail lamps 18, the one or more trailer turn signal lamps 20, and the one or more trailer brake lamps 22 by a conductive medium, such as a conductive wire. In one or more embodiments, the trailer lamp output circuit 34 is controlled by the one or more processors 26 and supplies a power signal such as a voltage or current signal to power to the one or more trailer tail lamps 18, the one or more trailer turn signal lamps 20, and the one or more trailer brake lamps 22 via the conductive wire when commanded by the one or more processors 26. In some embodiments, the trailer lamp output circuit 34 generally includes one or more electrical components, such as resistors, capacitors, transistors, inductors, and the like. In some embodiments, the trailer lamp output circuit 34 may include at least one electronic switching device, such as a metal-oxide-semiconductor field-effect transistor (MOSFET).

Still referring to FIG. 1, the exemplary trailer lamp current sensing device 36 is coupled to the communication path 24 and communicatively coupled to the one or more processors 26. In one or more embodiments, the trailer lamp current sensing device 36 is electrically coupled to the one or more trailer lamps 16 and the trailer lamp output circuit 34 by a conductive medium, such as a conductive wire. In some embodiments, the trailer lamp current sensing device 36 senses the current, such as the amperage level, drawn by the one or more trailer lamps 16 based on the trailer identification signal sent by the trailer lamp output circuit 34 and provides the sensed current to the one or more processors 26. The trailer lamp current sensing device 36 senses the current drawn by the one or more trailer lamps 16 by any method. In a non-limiting example, the trailer lamp current sensing device 36 includes one or more resistors, and the signal provided to the one or more processors is an analog voltage across the one or more resistors.

In some embodiments, the trailer tail lamp sensing circuit 42 is electrically coupled to the one or more trailer tail lamps 18 and the trailer lamp voltage output circuit 34 by a conductive medium, such as a conductive wire. In one or more embodiments, the trailer tail lamp sensing circuit 42 senses the current, or the amperage level, drawn by the one or more trailer tail lamp 18 based on the trailer identification signal by the trailer lamp output circuit 34 to the one or more trailer tail lamps 18 and provides the sensed current to the one or more processors 26.

In one or more embodiments, the trailer turn signal lamp sensing circuit 44 is electrically coupled to the one or more turn signal lamps 20 and the trailer lamp output circuit 34 by a conductive medium, such as a conductive wire. The trailer turn signal lamp sensing circuit 44 senses the current, or amperage level, drew by the one or more trailer turn signal lamps 20 based on the trailer identification signal supplied by the trailer lamp output circuit 34 to the one or more trailer turn signal lamps 20 and provides the sensed current to the one or more processors 26.

In some embodiments, the trailer brake lamp sensing circuit 46 is electrically coupled to the one or more trailer brake lamps 22 and the trailer lamp output circuit 34 by a conductive medium, such as a conductive wire. The trailer brake lamp sensing circuit 46 senses the current drew by the one or more trailer brake lamps 22 based on the trailer identification signal sent by the trailer lamp output circuit 34 to the one or more trailer brake lamps 22 and provides the sensed current to the one or more processors 26.

In some embodiments, as shown in FIG. 1, a temperature sensing circuit 48 may be provided on the trailer 14 near at the one or more trailer lamps 16 and electrically coupled to the communication path 24. In some embodiments, the temperature sensing circuit 48 may be communicatively coupled to the one or more processors 26 and the one or more memory modules 28, and senses environmental temperature near the one or more trailer lamps 16. In other embodiments, the vehicle 10 includes its own temperature sensing circuit, and the functionalities of the systems and methods described herein use the temperature reading of the vehicle 10 rather than a temperature sensing circuit 48 of the trailer 14.

Still referring to FIG. 1, the system 12 may include an example of one or more user interfaces 37 coupled to the communication path 24 such that the communication path 24 communicatively couples the one or more user interfaces 37 to other components of the system 12. The one or more user interfaces 37 may be any device capable of transforming mechanical, optical, or electrical signals into a data signal capable of being transmitted with the communication path 24. Specifically, the one or more user interfaces 37 may include any number of movable objects that each transform physical motion into a data signal that can be transmitted to over the communication path 24 such as, for example, a button, a switch, a knob, a touchscreen display, a microphone or the like. The one or more user interfaces 37 may allow a user such as a user, a driver, or an authorized entity, such as an authorized service provider or OEM, to input information about the vehicle 10. For example, using the one or more user interfaces 37, the user may enter one or more trailer profiles or specifications including but not limited to, the size of the trailer, the type of trailer, the trailer lamp current amounts, and the like. Such information may allow the system 12 to determine whether one or more sensed current signals are associated with data related to at least one saved trailer information. In some embodiments, the trailer profiles may already be stored/programmed onto the one or more memory modules 28.

FIG. 1 illustrates the user interface 37 such a display 38, which displays a menu for selecting and/or a graphical input device (not shown) for inputting a trailer ID name for naming the trailer 14 attached to the vehicle 10 along with optionally inputting information related to one or more trailer profiles. In one non-limiting example, the trailer profile may be displayed to the user and assigned a trailer ID name, by the user using the user interface 37, for the trailer 14 coupled to the vehicle 10. In another non-limiting example, using the user interface 37, the user may input information related to the trailer profile along with the trailer ID name.

The display 38, which may include a touchscreen display, may include buttons, switches, knobs or a digital keyboard, for example, to allow the user to edit a trailer ID name and/or request trailer information related to an attached, hitched, or connect trailer 14, as desired. In some embodiments, the one or more user interfaces 37 may provide additional information on the display 38, which may be useful to the user. In one non-limiting example, the user interface 37 may provide information such as trailer power supply, temperature near the one or more trailer lamps 16, trailer lamp status, tire inflation status, or the like. That is, relevant data from the trailer profile and or any sensed data such as temperature, trailer lamp currents, tire pressure, etc. may be displayed to a user, which may allow a user to dynamically determine and, perhaps, change desired threshold settings.

Referring still to FIG. 1, the display 38 may be configured for providing visual output such as, for example, information or notifications pertaining to the operational status of the one or more trailer lamps 16. In one embodiment, the display 38 is coupled to the communication path 24 and communicatively coupled to the one or more processors 26. In some embodiments, the display 38 may include any medium capable of transmitting an optical output such as, for example, light emitting diodes, a liquid crystal display, a plasma display, or the like. In some embodiments, the display 38 may include a combination meter positioned on a dashboard of the vehicle 10. In some embodiments, it is noted that the display 38 can include at the one or more processors 26 and/or the one or more memory modules 28. Additionally, it should be understood that in some embodiments, the system 12 does not include the display 38, such as in embodiments in which the system 12 does not provide visual output of information or notifications the identity of the trailer 14 connected to the vehicle 10.

In some embodiments, the system 12 depicted in FIG. 1 comprises the speaker 40 for transforming data signals from the system 12 into mechanical vibrations, such as in order to provide an audible indication of the trailer information. The speaker 40 is coupled to the communication path 24 and communicatively coupled to the one or more processors 26. However, it should be understood that in other embodiments the system 12 may not include the speaker 40, such as in embodiments in which the system 12 does not provide an audible indication of the operational status of the identity of the trailer 14 connected to the vehicle 10.

In one embodiment, the system 12 may include an example load varying device 50. The load varying device 50 may be interchangeably electrically coupled to the trailer 14 and/or the vehicle 10. The load varying device 50 may include a programmable resistor wherein a user may select a resistor value to the programmable resistor. In a non-limiting example, the load varying device 50 may be operated by a user (e.g. vehicle owner, commercial operator, manufacturer and/or trailer dealer) that owns several of the same or identical trailers, such as a commercial operator. To make each trailer 14 unique, the user can attach the load varying device 50 in order to change an amperage level of the one or more trailer lamps 16. In another non-limiting example, a user may purchase one or more after-market trailer lamps packages to install on one or more trailers 16. In order to specifically identify each trailer 14, the user may program the load varying device 50 to read a specific amperage related to a specific trailer 14. This way, the system 12 can detect amperage levels associated with different trailers 14 even though the trailers may be the same brand, type, and/or model.

In one or more embodiments, as shown in FIG. 1, the system 12 may include an electronic reader 52 and an electronic tag 54. The electronic reader 52 may be electrically coupled to the communication path 24, and communicatively coupled to the electronic tag 54. The electronic tag 54 may be affixed to the trailer 14.

In some embodiments, the electronic reader 52 may include a Radio Frequency Identification (RFID) Reader. The electronic reader 52 may be configured to receive a request from the system 12 and, in response, receive a trailer profile from the electronic tag 54 associated the trailer 14 connected to the vehicle 10.

In some embodiments, the electronic tag 54 may include a RFID tag. The electronic tag 54 may be programmed or configured to contain information related to a trailer profile associated the trailer 14 to which the electronic tag 54 is affixed or connected. The electronic tag 54 may be further configured to transmit the trailer profile when the trailer 14 is connected to the vehicle. The electronic tag 54 may be configured or programmed with the trailer profile by a trailer owner, trailer manufacturer, or trailer dealer. By using the electronic tag 54 and the electronic reader 52, a user can store the trailer profile with the trailer 14 instead of storing the trailer profile within vehicle's 10 memory modules 28. In some embodiments, the electronic tag 54 may be configured with a previously stored amperage level of a sensed current signal related to the one or more tail lamps of the trailer 14 connected with the vehicle 10. In a non-limiting example, the trailer 14 may include the load varying device 50 such that a user can store an amperage level of a previously sensed current signal from the one or more trailer lamps 16. When the trailer 14 is coupled to the vehicle 10, the system 12 may identify the trailer 14 based on the amperage levels of the sensed current signal received from the trailer lamp current sensing device 36 and the previously stored sensed current signal received from the electronic tag 54.

Figure 3:
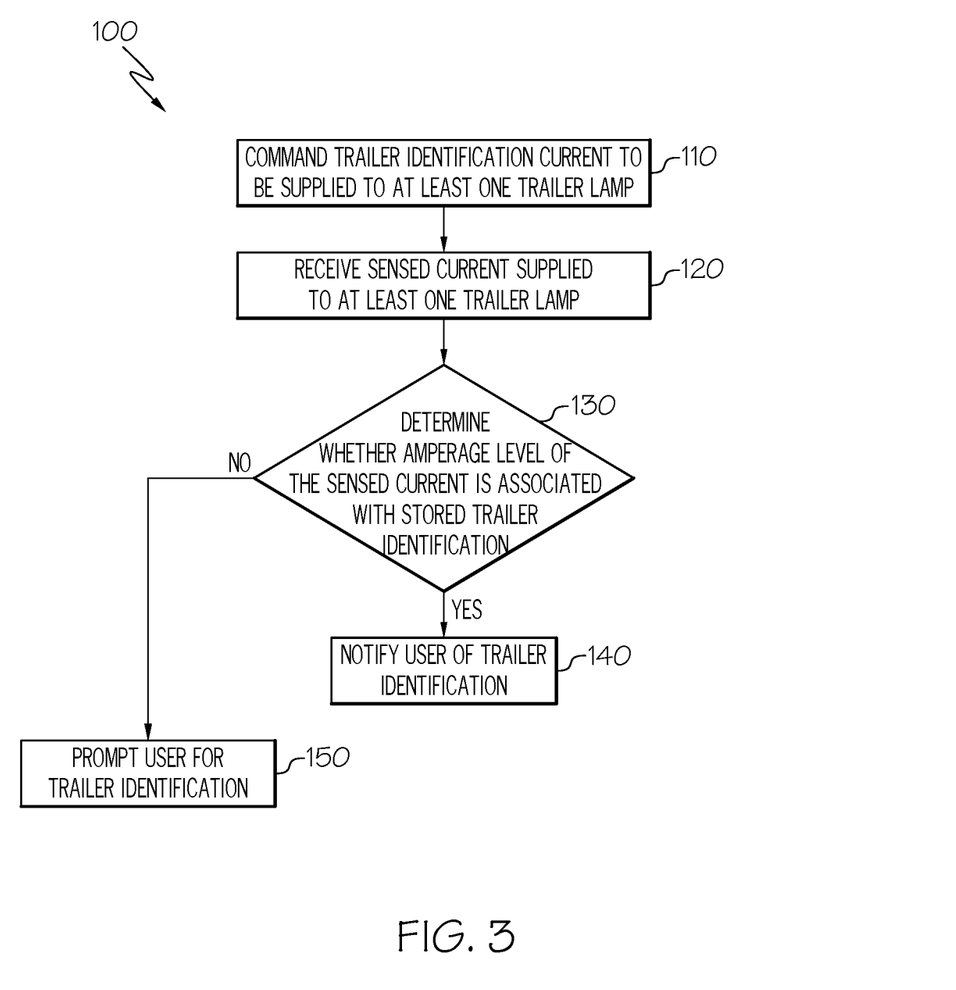
FIG. 3 schematically depicts an example flowchart of a method for determining an identity of a trailer according, to one or more embodiments shown and described herein.

FIG. 3 schematically depicts an example flowchart 100 for determining the identity of a trailer 14 connected to the vehicle 10. In some embodiments, when the trailer 14 is connected to the vehicle 10, the trailer activation input circuit 32 may detect or sense a power supply signal being supplied to the trailer 14 and send a request signal for the trailer identity to the one or more processors 26. In some embodiments, the user may actuate a button to send the request signal for the trailer identity at any time while the trailer 14 is connected to the vehicle 10. In some embodiments, the trailer lamp output circuit 34 may consistently or intermittently supply the trailer identification signal to the one or more trailer lamps 16 based on receiving the request signal for the trailer identity from the trailer activation input circuit 32. As a non-limiting example, the trailer identification signal may include a voltage signal of approximately 12 volts. In one or more embodiments, the voltage signal may include a plurality of voltage signals such that the voltage signal is selected based on the one or more trailer lamps 16 that is selected for identification. As a non-limiting example, if the one or more trailer tail lamps 18 is selected then the voltage signal may include a voltage signal of 6 volts. In other non-limiting example, if the one or more trailer brake lamps 22 or the one or more trailer turn signal-lamps are selected then the voltage signal may include a voltage signal of 12 volts.

Referring to FIGS. 1 and 3, in block 110, the machine readable instructions stored in the one or more memory modules 28, when executed by the one or more processors 26, may cause the system 12 to command the trailer lamp output circuit 34 to supply a trailer identification signal to the one or more trailer lamps 16.

In some embodiments, each trailer lamp 16 may draw a different and distinct current when connected to the vehicle 10. For example, if the one or more trailer tail lamps 18 are being sensed, the one or more turn signal lamps 20 may draw a current of 1.6 amperages. In still another example, if the one or more trailer turn signal lamps 20 are being sensed, then the one or more trailer turn signal lamp 20 may have a current of about 0.6 amperages. In yet another example, if the one or more trailer brake lamps 22 is being sensed, then the one or more trailer tail lamps 18 may have a current of 2.1 amperages. Thus, the sensed current signal is indicative of an amperage level of the current associated with a specific trailer lamp 16 of a specific trailer 14.

In block 120, the trailer lamp current sensing device 36, in response to the command to supply the trailer identification current, may receive a sensed current signal that identifies the trailer 14 associated with the one or more trailer lamps 16. In one embodiment, the vehicle 10 may detect trailer temperature, trailer tire pressure, trailer axel, the trailer brakes, etc. For example, the temperature sensing circuit 48 may sense a temperature signal of the outside environment near the trailer 14, in response to the command to supply the trailer identification current, in order to determine if the amperage level of the sensed current is still within an acceptable range. In one or more embodiments, the temperature sensing circuit 48 may send the sensed temperature signal to the one or more processors 26. In one embodiment, the system 12 may adjust the amperage level of the sensed current signal based on the sensed temperature signal in order to determine whether the amperage level of the sensed current is equivalent to a previously saved amperage level along with its previously saved temperature.

In some embodiments, in block 130, the system 12 may determine whether the amperage level of the sensed current signal or an adjusted amperage level of the sensed current signal is associated with the trailer identification stored within the one or more data storage device 30. In one example, the system 12 may check to determine whether an amperage level of the sensed current signal is stored with the trailer identification. If yes, then the method proceeds to block 140. If no, the method 100 proceeds to block 150.

At block 140, the system 12 may notify a user of the trailer identification associated with the trailer 14 stored within the one or more data storage devices 30 via the display 38, via a visual message, and/or the speakers 40, via an audio message. Any notification method may be utilized.

At block 150, the system 12 may prompt the user to input a trailer ID name, via the display 38 of a user interface 37, for the trailer 14. Using the user interface 37, the user may create and input the trailer ID name. Once the trailer ID name is entered, the system 12 may store the trailer ID name along and the amperage level of the sensed current as the trailer information in the one or more data storage devices 30. In at least one embodiment, the system 12 may search the one or more data storage devices 30 and retrieve a trailer profile based on the amperage level of the sensed current signal. If the trailer profile is located, the system 12 may notify the user of the trailer profile. In one non-limiting example, the system 12 may display, using the user interface 37 and the display 38, the trailer profile to the user.

In one or more embodiments, if the trailer profile is not located, the system 12 may prompt the user to enter data related to the trailer profile in addition to the trailer ID name. In a non-limiting example, the user may use the user interface 37 to enter data related to the trailer profile including trailer make, trailer model, trailer type, trailer height, trailer weight, amperage level for trailer brake lamps 22, amperage level for trailer turn signal lamps 20, and amperage levels for trailer tail lamps 18. In another embodiment, the trailer profile may be stored in the electronic tag 54 affixed and connected to the trailer 14. In a non-limiting example, the electronic tag 54 may transmit the trailer profile once the trailer 14 is connected to the vehicle 10. When the system 12 determines that the trailer 14 is connected to the vehicle 10 and searches for the trailer profile, the system 12, using the RFID reader 52, may read or receive a transmission of the trailer profile from the electronic tag 54.

It should now be understood that embodiments described herein are directed to systems and methods for automatically detecting a connected trailer by detecting an amperage draw from one or more trailer lamps of the trailer. In one or more embodiments, the systems and methods retrieve stored trailer information based on the amperage level drawn from the one or more trailer lamps and notify the user of the trailer information. In some embodiments, the trailer information may include a trailer name ID, the amperage level of a previously sensed current, and/or a related trailer profile. In one or more embodiments, the systems and methods may include a user interface to allow the user to input or edit the trailer information, such as the trailer name ID and/or the related trailer profile. In some embodiments, the systems and methods may include a temperature sensing circuit along with a current-temperature profile, stored in the system, associated with the one or more trailer lamps. The systems and methods may sense a temperature when detecting the amperage draw and adjust a sensed amperage draw based on a current-temperature profile and a sensed temperature. In one or more embodiments, the systems and methods may include a load-varying device to vary the resistance load of the one or more trailer lamps in order that a unique amperage level may be provided for each trailer lamp, and thereby each trailer may be uniquely identified.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for determining an identity of a trailer coupled to a vehicle, the system comprising:
   one or more trailer lamps;
   a trailer lamp current sensing device electrically coupled to the one or more trailer lamps;
   one or more processors;
   one or more data storage devices;
   one or more memory modules communicatively coupled to the one or more processors and storing machine readable instructions that cause the system to perform at least the following when executed by the one or more processors:
   receive a sensed current signal from the trailer lamp current sensing device;
   determine whether an amperage level of the sensed current signal is associated with a trailer identification stored within the one or more data storage devices, wherein the trailer identification comprises at least a trailer model; and
   notifying a user of the trailer identification stored in the one or more data storage devices for the trailer connected to the vehicle.

2. The system of claim 1, wherein the one or more trailer lamps comprises one or more trailer tail lamps; wherein the trailer lamp current sensing device comprises a trailer tail lamp sensing circuit; and wherein the machine readable instructions further comprises:
   receive a sensed tail lamp current signal from the trailer tail lamp sensing circuit;
   determine whether an amperage level of the sensed tail lamp current signal is associated with the trailer identification stored in the one or more data storage devices; and
   notifying the user of the trailer identification stored in the one or more data storage devices for the trailer connected to the vehicle.

3. The system of claim 1, wherein the one or more trailer tail lamp comprises one or more trailer turn signal lamps; wherein the trailer lamp current sensing device comprises a trailer turn signal sensing circuit; and wherein the machine readable instructions further comprises:
   receive a sensed trailer turn signal lamp current signal from a trailer turn signal lamp current sensing circuit;
   determine whether an amperage level of the sensed trailer turn signal current signal is associated with the trailer identification stored in the one or more data storage devices; and
   notifying the user of the trailer identification stored in the one or more data storage devices for the trailer connected to the vehicle.

4. The system of claim 1, wherein the one or more trailer lamps comprises one or more trailer brake lamps; wherein the trailer lamp current sensing device comprises a trailer brake lamp sensing circuit; and wherein the machine readable instructions further comprises:
- receive a sensed brake lamp current signal from the trailer brake lamp sensing circuit;
- determine whether an amperage level of the sensed brake lamp current signal is associated with the trailer identification stored in the one or more data storage devices; and
- notifying the user of the trailer identification stored in the one or more data storage devices for the trailer connected to the vehicle.

5. The system of claim 1, further comprising:
- a temperature sensing circuit; and wherein the machine readable instructions further comprises:
- receive a sensed temperature signal from the temperature sensing circuit when the trailer lamp current sensing device senses the sensed current signal from the one or more trailer lamps;
- determine whether to adjust the amperage level of the sensed current signal based on a degree of the sensed temperature signal in order to determine the identity of the trailer coupled to the vehicle; and
- notify the user of the trailer identification based on the amperage level of the sensed current signal and the degree of the sensed temperature signal.

6. The system of claim 1, further comprising:
- a user interface communicatively coupled to the one or more processors; and,
- wherein the machine readable instructions further comprises:
- receive the trailer identification from the user interface; and
- store the trailer identification and the amperage level of the sensed current signal into the one or more data storage devices.

7. The system of claim 1, wherein the trailer comprises a load varying device electrically coupled to the trailer, and wherein the load varying device is configured to change the amperage level of the sensed current signal of the one or more trailer lamps.

8. The system of claim 1, further comprising:
- an electronic tag connected to the trailer;
- an electronic reader coupled to the one or more processors and in communication with the electronic tag; and
- wherein the machine readable instructions further comprises:
- receive, from the electronic reader, a trailer profile associated with the trailer connect to the vehicle that is stored in the electronic tag; and
- notify the user of the trailer profile.

9. The system of claim 1, wherein the machine readable instructions further comprises:
- retrieve a trailer profile associated with the amperage level of the sensed current signal from the one or more data storage devices; and
- notify the user of the trailer profile for the trailer connected to the vehicle.

10. The system of claim 1, wherein the trailer identification further comprises one or more of a trailer make, a type of trailer, a trailer length, a trailer height, a trailer width, and an image of the trailer.

11. A system for determining an identity of a trailer coupled to a vehicle, the system comprising:
- one or more trailer lamps;
- a trailer lamp current sensing device electrically coupled to the one or more trailer lamps;
- one or more processors;
- one or more data storage devices;
- one or more memory modules communicatively coupled to the one or more processors and storing machine readable instructions that cause the system to perform at least the following when executed by the one or more processors:
- receive a sensed current signal from the trailer lamp current sensing device;
- determine whether an amperage level of the sensed current signal is associated with a trailer identification stored within the one or more data storage devices, wherein the trailer identification comprises dimensions of the trailer; and
- notifying a user of the trailer identification stored in the one or more data storage devices for the trailer connected to the vehicle.

12. The system of claim 11, wherein the one or more trailer lamps comprises one or more trailer tail lamps; wherein the trailer lamp current sensing device comprises a trailer tail lamp sensing circuit; and wherein the machine readable instructions further comprises:
- receive a sensed tail lamp current signal from the trailer tail lamp sensing circuit;
- determine whether an amperage level of the sensed tail lamp current signal is associated with the trailer identification stored in the one or more data storage devices; and
- notifying the user of the trailer identification stored in the one or more data storage devices for the trailer connected to the vehicle.

13. The system of claim 11, wherein the one or more trailer tail lamp comprises one or more trailer turn signal lamps; wherein the trailer lamp current sensing device comprises a trailer turn signal sensing circuit; and wherein the machine readable instructions further comprises:
- receive a sensed trailer turn signal lamp current signal from a trailer turn signal lamp current sensing circuit;
- determine whether an amperage level of the sensed trailer turn signal current signal is associated with the trailer identification stored in the one or more data storage devices; and
- notifying the user of the trailer identification stored in the one or more data storage devices for the trailer connected to the vehicle.

14. The system of claim 11, wherein the one or more trailer lamps comprises one or more trailer brake lamps; wherein the trailer lamp current sensing device comprises a trailer brake lamp sensing circuit; and wherein the machine readable instructions further comprises:
- receive a sensed brake lamp current signal from the trailer brake lamp sensing circuit;
- determine whether an amperage level of the sensed brake lamp current signal is associated with the trailer identification stored in the one or more data storage devices; and
- notifying the user of the trailer identification stored in the one or more data storage devices for the trailer connected to the vehicle.

15. The system of claim 11, further comprising:
- a temperature sensing circuit; and wherein the machine readable instructions further comprises:

receive a sensed temperature signal from the temperature sensing circuit when the trailer lamp current sensing device senses the sensed current signal from the one or more trailer lamps;

determine whether to adjust the amperage level of the sensed current signal based on a degree of the sensed temperature signal in order to determine the identity of the trailer coupled to the vehicle; and notify the user of the trailer identification based on the amperage level of the sensed current signal and the degree of the sensed temperature signal.

16. The system of claim 11, further comprising:
a user interface communicatively coupled to the one or more processors; and,
wherein the machine readable instructions further comprises:
receive the trailer identification from the user interface; and
store the trailer identification and the amperage level of the sensed current signal into the one or more data storage devices.

17. The system of claim 11, wherein the trailer comprises a load varying device electrically coupled to the trailer, and wherein the load varying device is configured to change the amperage level of the sensed current signal of the one or more trailer lamps.

18. The system of claim 11, further comprising:
an electronic tag connected to the trailer;
an electronic reader coupled to the one or more processors and in communication with the electronic tag; and
wherein the machine readable instructions further comprises:
receive, from the electronic reader, a trailer profile associated with the trailer connect to the vehicle that is stored in the electronic tag; and
notify the user of the trailer profile.

19. The system of claim 11, wherein the machine readable instructions further comprises:
retrieve a trailer profile associated with the amperage level of the sensed current signal from the one or more data storage devices; and
notify the user of the trailer profile for the trailer connected to the vehicle.

20. The system of claim 11, wherein the trailer identification further comprises one or more of a trailer make, a trailer model, a type of trailer, a trailer length, a trailer height, a trailer width, and an image of the trailer.

* * * * *